United States Patent Office 3,096,309
Patented July 2, 1963

3,096,309
WATER SOLUBLE BASIC RESINS CONTAINING NITROGEN
Hans Schläpfer, Basel, and Jakob Bindler, Riehen, near Basel, Switzerland, assignors to J. R. Geigy A.-G., Basel, Switzerland
No Drawing. Filed May 16, 1958, Ser. No. 735,695
Claims priority, application Switzerland May 27, 1957
8 Claims. (Cl. 260—67.5)

The present invention concerns water soluble basic resins containing nitrogen, as well as the production thereof. It also concerns the use of these new compounds for improving the wet fastness properties of dyeings and prints on cellulosic fibrous material and, finally, the cellulose dyeings which are fixed fast to wet therewith.

It has been found that water soluble basic resins containing nitrogen are obtained by heating 2-amino-imidazoline compounds of the general formula

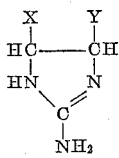

wherein X and Y taken individually represent a member selected from the group consisting of H and lower alkyl radicals, and wherein X and Y taken collectively represent a polymethylene radical, to 120° to 280° C., until about half a mol of ammonia per mol of starting product is split off, and if desired subsequently condensing the condensation products with bridge-forming reactants selected from the class consisting of formaldehyde and triazine compounds.

The 2-amino-imidazoline compounds used as starting materials can be produced for example by condensing α.β-alkylene or -cycloalkylene diamines with cyanogen halide. In the present process chiefly 2-amino-imidazoline itself is used as well as its derivatives substituted in the 4- and/or 5-positions by lower alkyl groups, in particular by methyl radicals or also by ethyl or propyl radicals.

The process is performed by heating the imidazoline compounds, either alone or together with inert organic solvents, suspension or melting agents in the absence of water and if necessary in the presence of condensing agents such as, for example, aromatic sulphonic acids, at higher temperatures until about one half mol of ammonia per mol of starting material is split off. The temperature at which the ammonia begins to split off depends on the constitution of the imidazoline compound used and possibly also on the solubility promoters used. According to experience it begins between 120° and 150° C. and is accelerated by raising the temperature. The amino-imidazolines used according to the present invention are condensed therefore at temperatures between 120° and that at which the compounds begin to decompose into soluble resins which, according to experience, is in the region of 280° and more. Optimal conditions for the splitting off of about half a mol of ammonia per mol of 2-amino-imidazoline compound are almost always attained at temperatures between 125° and 180°, for which reason this is the temperature range preferred in the present process.

The 2-amino-imidazoline compounds are reacted in the form of free amines or imines. They can also be used however in the form of their salts which dissociate within the given temperature range. The condition is that the acid split off in the reaction does not cause side reactions which hinder the condensation. Chiefly the salts of weaker, volatile acids are used, for example those of carbonic acid.

Organic, higher boiling compounds which are anhydrous and inert to the starting and end products are used as solubility promoters which may be used in the process according to the present invention, chiefly to attain a better intermixture of the reaction components. Advantageously organic solvents which boil between 120° and 200° are used, for example tetrachlorethane, ethylene glycol, cyclohexanol, anisol, decahydronaphthalene, dimethyl formamide, dimethyl acetamide and dimethyl sulphoxide.

After the condensation which, if necessary, can be performed in a closed vessel, any solubility promoters used are removed from the reaction product advantageously by distillation under reduced pressure. The condensation products are colourless to weakly yellow coloured, viscous oils which generally soon solidify into resins (of colophonium-like appearance). The products dissolve completely in water and can be converted into salts with inorganic or organic acids.

The water soluble, basic compounds containing nitrogen produced according to the present invention and their water soluble salts are valuable auxiliaries in textile finishing. As such, they have in particular the property of increasing the wet fastnesses of those dyeings and prints produced with water soluble dyestuffs, the water solubility of which is due to the presence of carboxylic or sulphonic acid groups or the salts thereof. Chiefly those dyeings and prints are meant which are obtained with direct dyestuffs which may possibly be coppered or contain copper, on cellulosic fibrous material such as cotton, linen, artificial silk or staple rayon. In the most simple case, the wet fastnesses of the dyed or printed material is improved by treating it in an aqueous bath, at medium temperatures, for example 40–50°, containing one of the basic resins containing nitrogen produced according to the present invention. After rinsing and drying, the cellulose dyeings have greatly improved wet fastness properties which, depending on the dyestuff, can be rated good to very good. Often direct dyeings impregnated according to the present invention can even withstand a soap washing at 80°. Shade and fastness to light are not, or barely impaired by the after-treatment.

It is sometimes of advantage to use the new compounds containing nitrogen together with soluble salts or complex compounds of copper, this particularly in the case of dyeings produced with complex copper compounds of direct dyestuffs or with so-called after-coppering dyestuffs. In the latter case, it is possible to perform the after-treatment and the coppering in the same bath. The use of copper compounds with those according to the present invention can, apart from even increasing the wet fastnesses in some case, also have a favourable influence on the fastness to light of the dyeing. Naturally the treatment with the copper compounds can also be made from a fresh bath after the treatment with the compounds according to the present invention.

It is also possible subsequently to condense the new basic nitrogen compounds to form a higher molecule, for example with bridge-forming reactants such as reactive carbamyl or halogen compounds. Thus they can be further condensed with formaldehyde or by reaction reaction with a heterocyclic nitrogen compound containing more than 1 mobile halogen atom such as cyanuric chloride. Often these further condensed compounds even increase the already improved wet fastness properties of cellulose dyeings.

It is also possible to use the compounds produced according to the present invention for fixing acid tanning agents, for increasing the affinity to acid dyestuffs of cellulose fibres or for precipitating acid dyestuffs from their aqueous solutions.

Details can be seen from the following examples. In these examples where not otherwise stated parts are given as parts by weight. The temperatures are in degrees centigrade. The relationship of parts by weight to parts by volume is as that of grammes to cubic centimetres. The examples only serve to illustrate the invention and do not limit it in any way.

*Example 1*

In a solution of 95 parts of 4-methyl-2-amino-imidazoline hydrochloride in 250 parts of water, the base is liberated by the addition of 28 parts of sodium hydroxide at 50–80° and the mixture is evaporated to dryness in the vacuum. The base is taken up in abs. ethanol and the sodium chloride is filtered off. The alcohol is then distilled off and the oily base is heated for 3 hours at 130 to 170° during which time 6 parts of ammonia are given off and a clear, viscous mass is formed which solidifies on cooling to a brittle, basic resin which is water soluble. To convert the resin into the sulphuric acid salt, the solution of 50 parts of resin in 80 parts of water is neutralised at a temperature not higher than 45° with 43.5 parts of 40% sulphuric acid and then evaporated to dryness in the vacuum. A pale coloured powder which dissolves in water with a neutral reaction is obtained which can be used as follows for improving wet fastness properties:

Cotton material is dyed in the usual way with 3% Diphenyl Fast Brown BRL (Colour Index 30145), well rinsed and after-treated for 15 minutes at 40° in a fresh bath (liquor ratio 1:30) with a solution of 2% (calculated on the weight of the material) of the sulphate of the condensation product as well as 1% of diammine copper acetate. The cotton is then rinsed, wrung out and dried at 60–70°. On washing this material with 5 parts of soap and 2 parts of sodium carbonate per litre at 80°, no bleeding onto white cotton occurs whereas the untreated dyeing bleeds very strongly.

If 95 parts of 5-methyl-2-amino-imidazoline hydrochloride, 105 parts of 4.5-dimethyl-2-amino-imidazoline hydrochloride or 123.0 parts of 4.5-tetramethylene-2-amino-imidazoline hydrochloride are used in the above process, then a basic resin is also obtained, the sulphate of which has a similar action.

*Example 2*

85 parts of crystallised 2-amino-imidazoline (M.P. 89–90°) are slowly heated to a temperature of 135° whereupon ammonia begins to split off. The temperature is raised from 140–170° over a period of 5 to 7 hours. After this time, the ammonia development is practically completed and the originally thinly flowing solution turns into a viscous clear melt which solidifies on cooling into a brittle resin. The yield is 73 parts. The condensation product has a nitrogen content of 43.1% and dissolves in water with a strongly alkaline reaction.

50 parts of this resin are dissolved in 100 parts of water and the solution is neutralised at a temperature not exceeding 45° with 43 parts of 100% sulphuric acid. 67 parts of a pale grey powder which dissolves easily in water can be isolated if the neutralised solution is evaporated to dryness in the vacuum at 70–80°.

A cotton dyeing is produced with Solophenyl Violet 4 BL (C.I. Direct Violet 48) and is after treated with a 3% aqueous solution of this sulphate for 15 minutes at 40–50° (liquor ratio 1:30). After the material has been washed as described in Example 1, there is practically no bleeding onto undyed cotton.

*Example 3*

69.5 parts of 2-amino-imidazoline carbonate (M.P. 162°) are heated for 2–3 hours at 160–170° while stirring well. At 145°, the carbonate slowly melts and water, carbon dioxide and ammonia are given off simultaneously. The development of ammonia which at first is strong, gradually decreases and what was formerly a thinly liquid reaction mass becomes a viscous, pale yellow coloured melt which, on cooling, solidifies into a brittle, strongly basic resin. The yield is 49 parts.

On neutralising an aqueous solution of this resin with sulphuric acid at a temperature of under 40° and evaporating off the water, a pale grey powder is obtained which has the same properties as that obtained according to Example 2.

If, instead of the 2-amino-imidazoline carbonate, 78 parts of 4-methyl-2-amino-imidazoline carbonate or 67.5 parts of 2-amino-imidazoline hydrochloride are used and the condensation is performed at a temperature of 165–180° or 240–250° respectively, then products having similar or the same properties respectively are obtained.

*Example 4*

51 parts of 2-amino-imidazoline are dissolved in 100 parts of cyclohexanol and the solution is heated to 125 to 130° while stirring well. Ammonia begins to split off at this temperature. It is kept at this temperature for another 4 to 5 hours, then heated for 1½ hours at 155° and finally for about 2 hours at 160–165°. After this time the development of ammonia is practically completed. The solvent is then removed by distilling off in the vacuum and the basic condensation product is converted into the hydrochloride by neutralising with hydrochloric acid. It has properties similar to those of the sulphate obtained according to Example 2.

Ethylene glycol or dimethyl formamide can be used as solvent instead of cyclohexanol with the same success in the above example.

*Example 5*

60 parts of the condensation product obtained according to Example 2 are dissolved at room temperature in 85 parts of water. This solution is added dropwise within 10 minutes to a suspension of 13 parts of cyanuric chloride in 80 parts of water which is being well stirred at 0–10°. The reaction mixture is then kept for 2 hours at a temperature of 10–15° and then for an hour at 40–45°. 30% hydrochloric acid is added to the solution obtained until the pH value is 8–9 and the whole is then stirred for another hour at 80–85°. After neutralising with hydrochloric acid, the solution, which has been clarified if necessary, is evaporated to dryness in the vacuum at 70–90°. A grey-white, water soluble powder is obtained.

After a treatment with a 2% aqueous solution of this further condensed resin, cotton dyeings produced with Solophenyl Yellow 2 GL (C.I. Direct Yellow 39) or Solophenyl Ruby BL (C.I. Direct Red 105) or Solophenyl Olive BL (C.I. Direct Green 37) or Solophenyl Grey 4 GL (C.I. Direct Black 62) have considerably improved fastness to washing. On washing with 5 parts of soap and 2 parts of sodium carbonate per litre at 80°, the dyeings practically do not bleed at all.

If the basic condensation products produced with 4.5-tetramethylene-2-amino-imidazoline hydrochloride and 4-methyl-2-amino-imidazoline carbonate are reacted with cyanuric chloride as described above, then water soluble resins having similar properties are obtained.

*Example 6*

70 parts of the basic condensation product obtained according to Example 2 are dissolved in 200 parts of water and the solution is added at room temperature to a fine paste of 11.4 parts of 2-methylamino-4.6-dichloro-1.3.5-triazine in 100 parts of water. Slight heat is generated and the triazine derivative quickly dissolves whereupon the reaction solution is heated for 1 hour at 40–45°. 30% hydrochloric acid is then added to the practically clear solution until it has a pH value of 9. It is then stirred for 1 hour at 80–85°. Finally the solution is neutralised with hydrochloric acid and evaporated to dryness in the vacuum at 70–90°. 100 parts of a grey-white powder are obtained which can be used as described in Example 2, for improving the fastness properties of substantive dyeings.

If, instead of 2-methylamino-4.6-dichloro-1.3.5-triazine, 14 parts of 2-diethylamino-4.6-dichloro-1.3.5-triazine or 10.5 parts of 2-amino-4.6-dichloro-1.3.5-triazine are used and otherwise the same procedure as described above is followed, then water soluble reaction products having similar properties are obtained.

*Example 7*

60 parts of the condensation product obtained according to Example 2 are dissolved at room temperature in 140 parts of water, and 31% hydrochloric acid is added until the pH value is 6. 85 parts of 37.5% formaldehyde are then added and the acid solution is heated within 25 minutes to 90–95° and then stirred for half an hour at this temperature. After evaporating to dryness in the vacuum at 70–80°, a grey condensation product is obtained which can be used for the improvement of fastness properties of substantive dyeings as described in Example 2.

If the condensation with formaldehyde is performed at a pH value of 8–9 and otherwise the same procedure is followed, then a water soluble reaction product having similar properties is obtained.

What we claim is:

1. A water-soluble nitrogen-containing basic resin obtained exclusively by heating to a temperature of about 120 to 280° C. a member selected from the group consisting of
   (a) a 2-amino-imidazoline of the formula

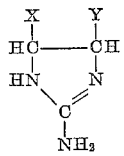

(b) a salt of the said 2-amino-imidazoline with a weak volatile acid,
   (c) a mixture of (a) and an inert high-boiling compound, and
   (d) a mixture of (b) and an inert high-boiling compound,
       wherein each of X and Y is a member selected from the group consisting of hydrogen and lower alkyl, and X and Y taken together represent —$CH_2$—$CH_2$—$CH_2$—$CH_2$—, until about 0.5 mole of ammonia per mole of imidazoline has been split off;
   and separating, in the case of (c) and (d), the resulting resin from the solvent.

2. A condensation product obtained by condensing (1) a water-soluble nitrogen-containing resin obtained exclusively by heating to a temperature of about 120 to 280° C. a member selected from the group consisting of
   (a) a 2-amino-imidazoline of the formula

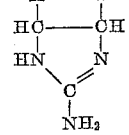

and (b) a salt of the said 2-amino-imidazoline with a weak volatile acid,
       wherein each of X and Y is a member selected from the group consisting of hydrogen and lower alkyl and X and Y taken together represent —$CH_2$—$CH_2$—$CH_2$—$CH_2$—, until about 0.5 mole of ammonia per mole of imidazoline has been split off;
   and (2) formaldehyde, in a ratio of one mole of formaldehyde per about 3 to 15 moles of said member.

3. A condensation product obtained by condensing (1) a water-soluble nitrogen-containing resin obtained exclusively by heating to a temperature of about 120 to 280° C. a member selected from the group consisting of
   (a) a 2-amino-imidazoline of the formula

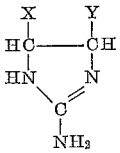

and (b) a salt of the said 2-amino-imidazoline with a weak volatile acid,
       wherein each of X and Y is a member selected from the group consisting of hydrogen and lower alkyl and X and Y taken together represent —$CH_2$—$CH_2$—$CH_2$—$CH_2$—, until about 0.5 mole of ammonia per mole of imidazoline has been split off;
   and (2) 1.3.5-triazine containing more than one mobile halogen atom, in a molar ratio of about 1 mole of 1.3.5-triazine per about 3–15 moles of said member.

4. The water soluble, nitrogen-containing basic resin obtained exclusively by heating 4-methyl-2-amino-imidazoline to 130°–170° C. until about half a mol of ammonia per mol of 4-methyl-2-amino-imidazoline has been split off.

5. The water soluble, nitrogen-containing basic resin obtained exclusively by heating 2-amino-imidazoline to 135°–170° C. until about half a mol of ammonia per mol of 2-amino-imidazoline has been split off.

6. The water soluble, nitrogen-containing basic resin obtained exclusively by heating 2-amino-imidazoline at 135°–170° C. until about half a mol of ammonia per mol of 2-amino-imidazoline has been split off and subsequently condensing the resultant condensation product with about 1 mol of 2.4.6-trichloro-1.3.5-triazine per 10 mols of 2-amino-imidazoline.

7. The water soluble, nitrogen-containing basic resin obtained exclusively by heating 2-amino-imidazoline at 135°–170° C. until about half a mol of ammonia per mol of 2-amino-imidazoline has been split off and subsequently condensing the resultant condensation product with about 1 mol of 2-methyl-amino-4.6-dichloro-1.3.5-triazine per 15 mols of 2-amino-imidazoline.

8. The water soluble, nitrogen-containing basic resin obtained exclusively by heating 2-amino-imidazoline at 135°–170° C. until about half a mol of ammonia per mol of 2-amino-imidazoline has been split off and subsequently condensing the resultant condensation product with about 1 mol of formaldehyde per 3 mols of 2-amino-imidazoline.

References Cited in the file of this patent

UNITED STATES PATENTS

| | | |
|---|---|---|
| 2,366,129 | Rust | Dec. 26, 1944 |
| 2,473,111 | Short et al. | June 14, 1949 |
| 2,474,909 | Olpin et al. | July 5, 1949 |
| 2,884,383 | Grundmann et al. | Apr. 28, 1959 |